UNITED STATES PATENT OFFICE.

JULIUS IRION, OF PHILADELPHIA, PENNSYLVANIA.

ARTIFICIAL STONE.

SPECIFICATION forming part of Letters Patent No. 249,839, dated November 22, 1881.

Application filed August 20, 1881. (Specimens.)

*To all whom it may concern:*

Be it known that I, JULIUS IRION, a subject of Germany, residing at Philadelphia, in the county of Philadelphia, State of Pennsylvania, have invented a new and useful Improvement in Artificial Stone, which improvement is fully set forth in the following specification.

In carrying out my invention, I take crystallized sandstone and burn the same, after the manner of limestone, in order to remove foreign substances therefrom, and when the same is thoroughly heated it is ground and sifted, and the desirable sand then washed in water. In order to form a mass of the sand as produced I combine with it a quantity of flour, castor-meal, or pulverized limestone as a binder, the flour or meal being made into dough, and the limestone ground in water, and the whole being well worked. In order to impart to the mass a proper body and an even color, I add to it pipe-clay or prepared chalk, all thoroughly mixed, and then mold the product, placing it in forms which are well greased. After this the shapes are dried in an oven, then exposed to the air to insure the drying operation, next placed in fire-proof earthen boxes or other protectors and burned in a suitable kiln, the length of time required therefor being equal to that employed for making brick. The stones may then be polished and finished, and they will be found to be of superior quality and appearance, the latter being soft and bright and the former strong and durable, without roughness and grit.

Having thus described my invention, what I claim as new, and desire to secure by Letters Patent, is—

Artificial stone formed of burned crystallized sandstone, prepared chalk, and flour thoroughly incorporated, molded, and burned, as set forth.

JULIUS IRION.

Witnesses:
   HENRY C. WARNICK,
   WM. P. BECKER.